(12) United States Patent
Kim et al.

(10) Patent No.: US 9,185,261 B2
(45) Date of Patent: Nov. 10, 2015

(54) INPUT DEVICE AND IMAGE PROCESSING METHOD THEREOF

(71) Applicant: LG ELECTRONICS INC., Seoul (KR)

(72) Inventors: Minwoo Kim, Seoul (KR); Jungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 13/802,061

(22) Filed: Mar. 13, 2013

(65) Prior Publication Data
US 2014/0160503 A1 Jun. 12, 2014

(30) Foreign Application Priority Data

Dec. 10, 2012 (KR) .......................... 10-2012-0142447

(51) Int. Cl.
G06K 9/36 (2006.01)
G06K 9/20 (2006.01)
H04N 1/387 (2006.01)
G06K 9/34 (2006.01)
H04N 1/00 (2006.01)
H04N 1/107 (2006.01)
H04N 1/195 (2006.01)
H04N 101/00 (2006.01)

(52) U.S. Cl.
CPC .............. H04N 1/3876 (2013.01); G06K 9/342 (2013.01); H04N 1/00241 (2013.01); H04N 1/107 (2013.01); H04N 1/19568 (2013.01); G06K 2009/2045 (2013.01); H04N 1/00307 (2013.01); H04N 2101/00 (2013.01); H04N 2201/0041 (2013.01); H04N 2201/0049 (2013.01); H04N 2201/0055 (2013.01); H04N 2201/0081 (2013.01)

(58) Field of Classification Search
CPC . H04N 1/00241; H04N 1/3876; H04N 1/107; H04N 1/19568; H04N 2101/00; H04N 2201/0041; H04N 2201/0081; G06K 9/342; G06K 2009/2045
USPC .................. 382/173, 190, 276, 294, 312, 284
See application file for complete search history.

(56) References Cited

U.S. PATENT DOCUMENTS

| 6,128,416 A | 10/2000 | Oura |
| 6,507,415 B1 * | 1/2003 | Toyoda et al. ................ 358/450 |
| 8,253,985 B2 * | 8/2012 | Fu et al. ........................ 358/448 |
| 2002/0163530 A1 | 11/2002 | Takakura et al. |
| 2011/0002544 A1 | 1/2011 | Oshima |
| 2013/0004079 A1 | 1/2013 | Yamada et al. |
| 2013/0033640 A1 | 2/2013 | Lee |

FOREIGN PATENT DOCUMENTS

| JP | 2011-13890 A | 1/2011 |
| KR | 10-1027306 B1 | 3/2011 |
| WO | WO 2012/096163 A1 | 7/2012 |

* cited by examiner

Primary Examiner — Kanjibhai Patel
(74) Attorney, Agent, or Firm — Birch, Stewart, Kolasch & Birch, LLP

(57) ABSTRACT

Provided are an input device and an image processing method thereof. The image processing method of the input device having a scan function includes acquiring a first image frame and a second image frame to detect coordinates of the acquired first image frame and coordinates of the acquired second image frame; dividing an overlap region between the first image frame and the second image frame into a plurality of sub overlap regions by using the detected coordinates of the first and second image frames; dividing each of the sub overlap regions into unit regions; setting a reference feature point of a plurality of feature points within the divided unit regions; and extracting corresponding points by using the set reference feature point.

13 Claims, 10 Drawing Sheets

FIG.2
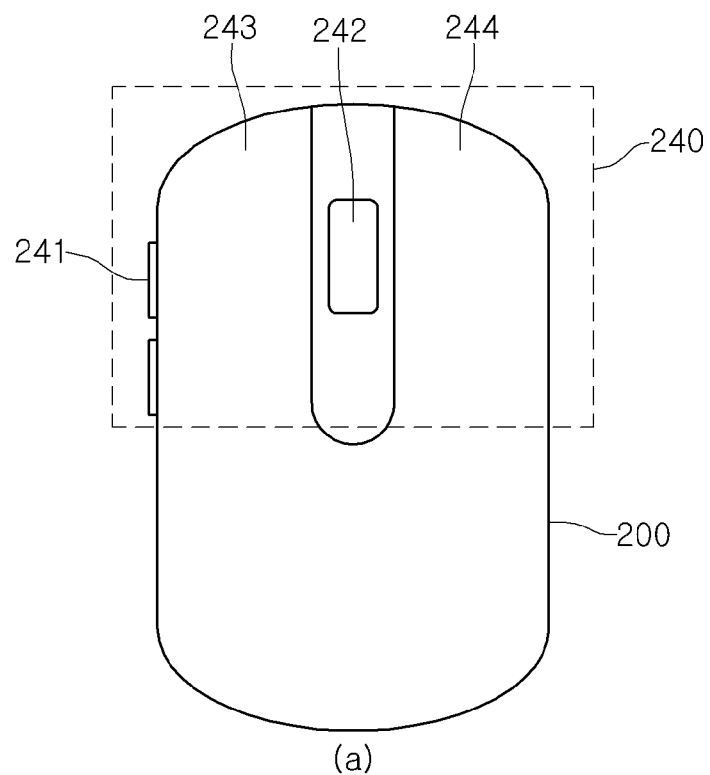
(a)
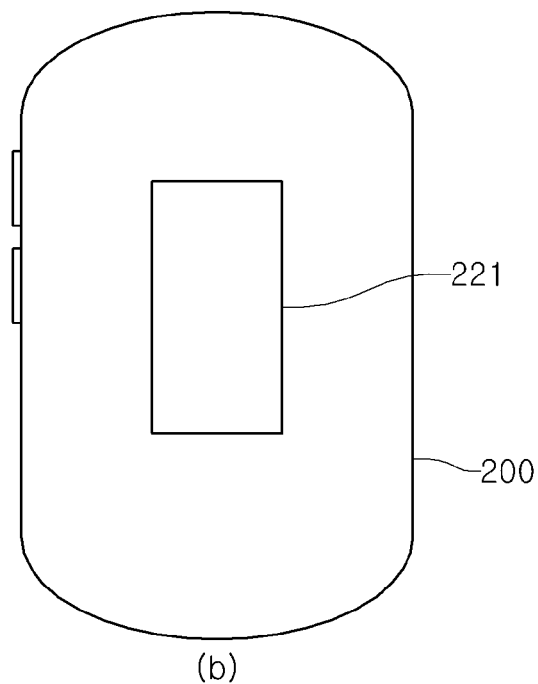
(b)

FIG.8
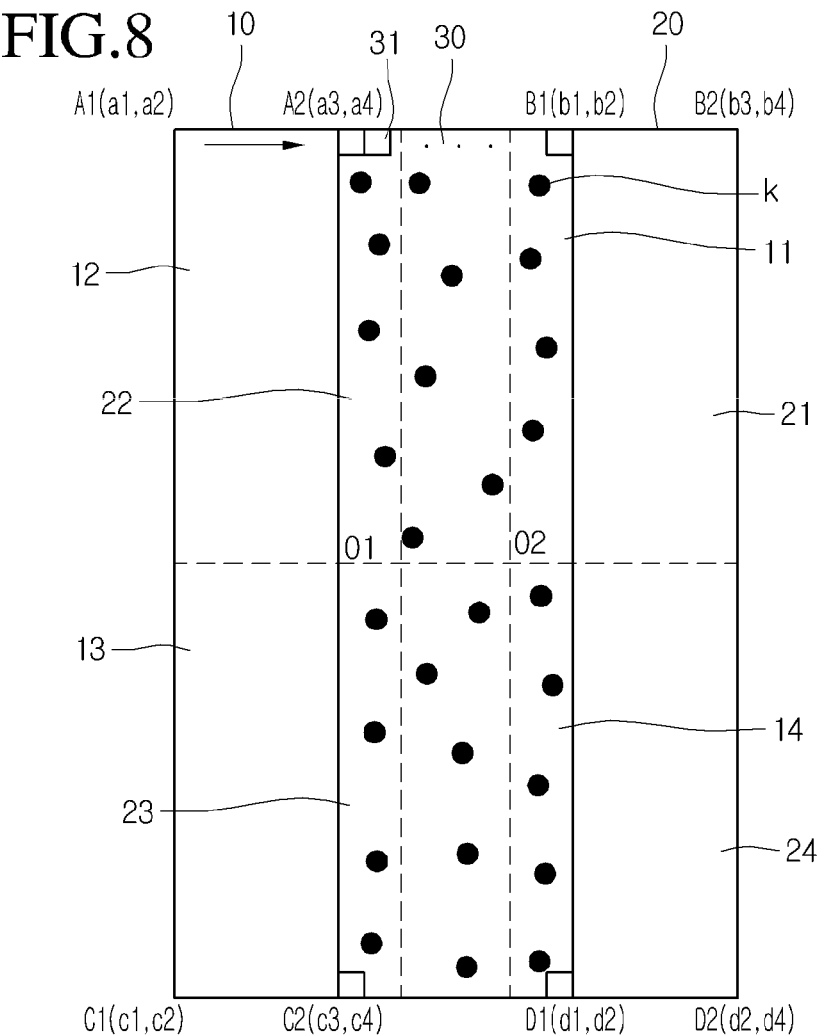
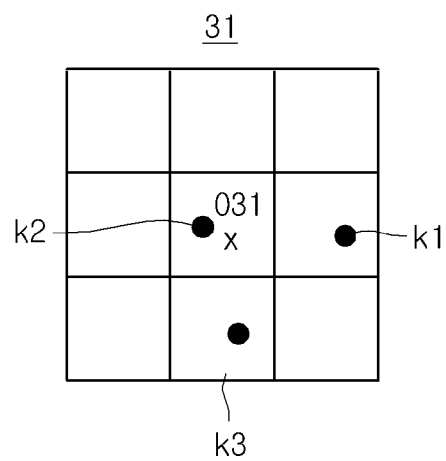

FIG.9
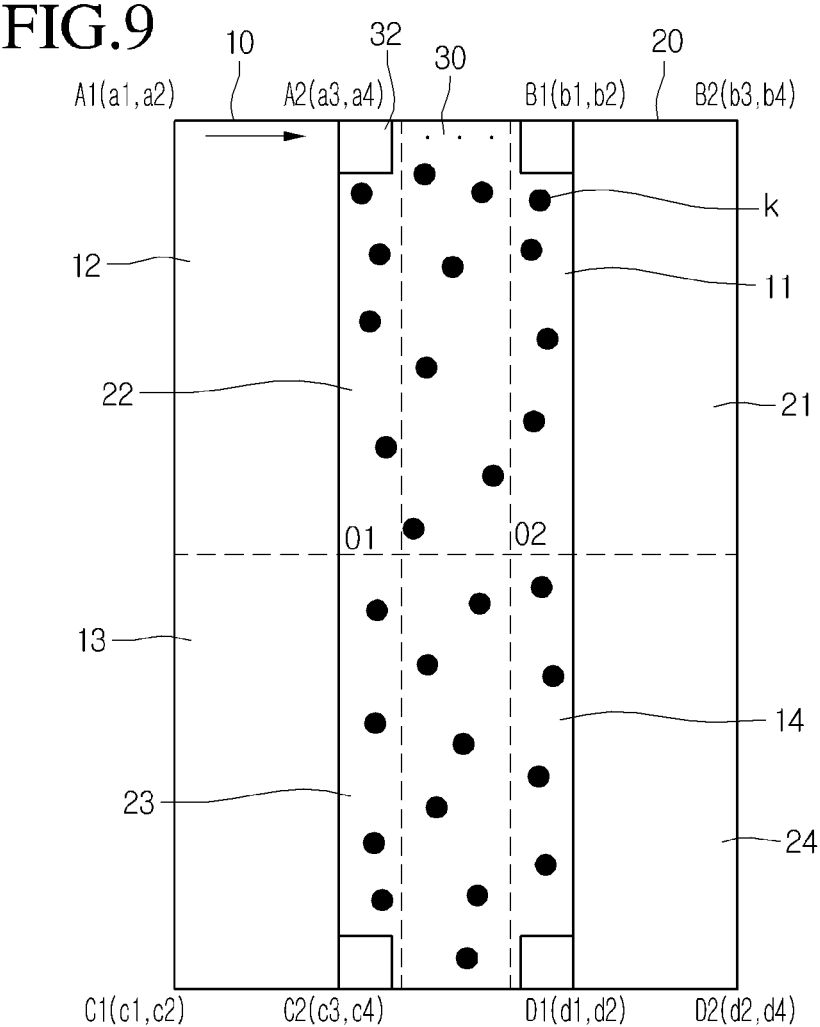
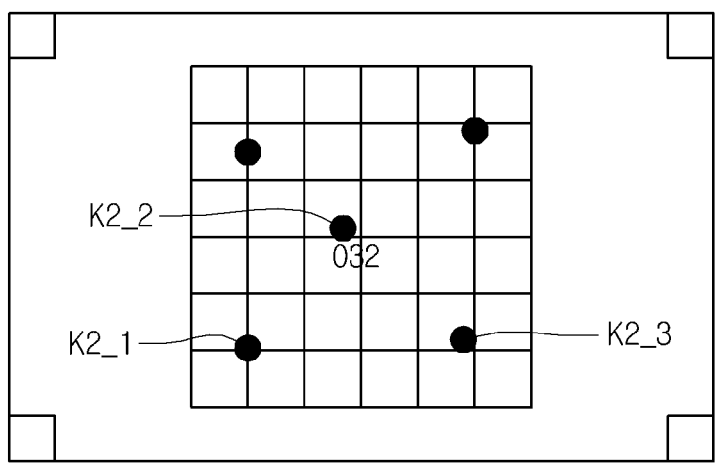

INPUT DEVICE AND IMAGE PROCESSING METHOD THEREOF

CROSS REFERENCE TO RELATED APPLICATION

This application claims the benefit of Korean Patent Application No. 10-2012-0142447, filed on Dec. 10, 2012 entitled "INPUT DEVICE AND IMAGE PROCESSING METHOD THERE OF", which is hereby incorporated by reference in its entirety into this application.

BACKGROUND

The present disclosure relates to an input device and an image processing method thereof.

In general, complex machines having a scan function read document data from each of pages of a document to be scanned to print the read document data or transmit the read document data to the outside by using a communication device such as a modem. Thus, complex machines having the scan function according to a related art are insufficient to scan a document having a volume greater than a predetermined volume. Also, since complex machines having the scan function according to the related art have low mobility, an object to be scanned should move to the fixed complex machines to scan simple images such as card-sized photographs.

With the development of digital technologies, input devices, e.g., input devices such as mouse and the like have various additional functions in addition to their original functions. Thus, consumers utilize the additional functions to satisfy a variety of needs by using only one device.

However, input devices having existing scan function may take a loge delay time to merge and process images when feature points variously exist on the object to be scanned.

There is disclosed Korean Patent Registration No. 10-1027306 (Title: Handy scanner apparatus and control method thereof) as prior art documents.

SUMMARY

Embodiments provide an input device capable of effectively and quickly processing an image frame of an object to be scanned and an image processing method thereof.

In one embodiment, an image processing method of an input device having a scan function includes: acquiring a first image frame and a second image frame to detect coordinates of the acquired first image frame and coordinates of the acquired second image frame; dividing an overlap region between the first image frame and the second image frame into a plurality of sub overlap regions by using the detected coordinates of the first and second image frames; dividing each of the sub overlap regions into unit regions; setting a reference feature point of a plurality of feature points within the divided unit regions; and extracting corresponding points by using the set reference feature point.

In another embodiment, an input device having a scan function includes: a scanning unit acquiring a first image frame and a second image frame; a coordinate detection unit detecting coordinates of the acquired first image frame and coordinates of the acquired second image frame; a region division unit dividing an overlap region between the first image frame and the second image frame into a plurality of sub overlap regions by using the detected coordinates of the first and second image frames, the region division unit dividing each of the sub overlap regions into unit regions; a reference feature point setting unit setting a reference feature point of a plurality of feature points within the divided unit regions; and a corresponding point extraction unit extracting corresponding points by using the set reference feature point.

In further another embodiment, a record medium in which a program for executing the image processing method of the input device disclosed is recorded.

According to the embodiments, the feature point within the overlap region between the image frames may be effectively detected to improve an image processing rate with respect to the scan target object.

The details of one or more embodiments are set forth in the accompanying drawings and the description below. Other features will be apparent from the description and drawings, and from the claims.

BRIEF DESCRIPTION OF THE DRAWINGS

FIG. 2 is plan and back views of an input device having a scan function according to an embodiment.

FIG. 8 is a view illustrating a process of setting a first feature point within an overlap region between a first image frame and a second image frame according to an embodiment.

FIG. 9 is a view illustrating a process of setting a second feature point within the overlap region between the first image frame and the second image frame according to an embodiment.

DETAILED DESCRIPTION OF THE EMBODIMENTS

Preferred embodiments of the present disclosure will be described below in more detail with reference to the accompanying drawings, such that those skilled in the art can realizes the technical ideas of the present disclosure without difficulties.

Figure 1:
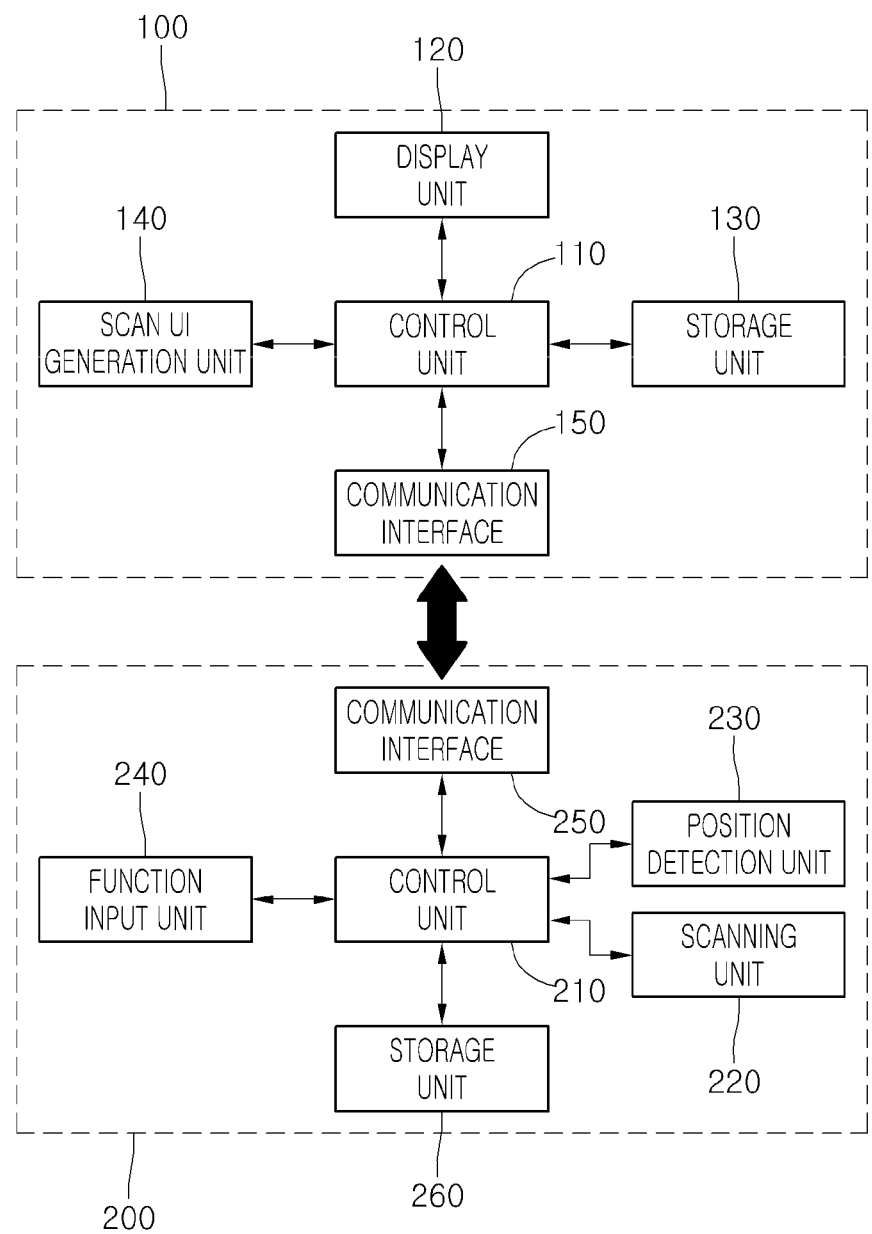
FIG. 1 is a block diagram of a scan image processing system according to an embodiment.

FIG. 1 is a block diagram of a scan image processing system according to an embodiment.

Referring to FIG. 1, a scan image processing system according to an embodiment includes a display device 100 and an input device 200.

The display device 100 may be one of devices that are capable of executing a scan driver program and include a display unit, such as computers, digital TVs, mobile phones, and the like.

The display device 100 includes a control unit 110, a display unit 120, a storage unit 130, a scan UI generation unit 140, and a communication interface 150.

The control unit 110 may control an overall operation of the display device 100. For example, the control unit 110 may control the communication interface 150 so that the communication interface 150 receives various input signals inputted from the outside and various data transmitted from the outside and process the received input signals and data to display the processed signal or data on the display unit 120 or store the process signal or data in the storage unit 130.

The display unit 120 may convert various image signals, data signals, and OSD signals processed in the control unit 110 into R, G, and B signals to generate driving signals.

For this, the display unit 120 may include PDP, LCD, OLED, flexible displays, 3D displays, and the like. Alternatively, the display unit 120 may include a touch screen so that the display unit 120 is used as an input device in addition to an output device.

The display unit 120 according to an embodiment may display a scan UI window for displaying scan images transmitted from the input device 200 that will be described later.

The storage unit 130 may store programs for processing and controlling various signals within the control unit 110 and also store image, audio, or data signals that are processed as signals.

Also, the storage unit 130 may temporarily store image, audio, or data signals inputted from the communication interface 150.

The storage unit 130 according to an embodiment may store the scan driver program for controlling the display device 100 to perform a scan operation.

The storage unit 130 may include at least one type storage medium of a flash memory type storage medium, a hard disk type storage medium, a multimedia card micro type storage medium, a card type memory (for example, an SD or XD memory), a RAM, and a EEPROM.

The scan UI generation unit 140 generates the scan UI window and an edit UI window for displaying a realized state of the scan driver program. The generated scan UI window and edit UI window are displayed on a screen through the display unit 120. Here, a user controls the scan operation of the input device 200 through the scan UI window. Also, the user may manipulate various function setting buttons provided on the scan UI window to generate various scan control commands. Also, the user may manipulate various function setting buttons provided on the edit UI window to generate various edit control commands.

The communication interface 150 performs radio wire communication with an external device to receive various input signals and the image, audio, or data signals from the external device.

When the communication interface 150 communicates with the external device through a wire, the communication interface 150 may be constituted by a serial, PS/2, USB, etc. Also, the communication interface 150 wirelessly communicates with the external device, the communication interface 150 may be constituted by a radio frequency identification (FRID), an infrared data association (IrDA), an ultra wideband (UWB), a Zigbee, a digital living network alliance (DLNA), etc.

The input device 200 may include various input devices having a scanner function, for example, a mouse, a keyboard, a remote controller, and the like. Also, if the input device 200 has the scanner function, the input device 200 may include a portable terminal such as a mobile phone, a PMP, a PDA, and the like.

The input device 200 includes a control unit 210, a scanning unit 220, a position detection unit 230, a scan function input unit 240, a communication interface 250, and a storage unit 260.

The control unit 210 may control an overall operation of the input device 200. For example, the control unit 210 may control the communication interface 250 so that a scan image of an object to be scanned that is acquired from the scanning unit 220 and position data required from the position detection unit 130 are transmitted into the external device through the communication interface 250 and control the storage unit 260 so that the scan image and the position data are stored in the storage unit 260.

Also, the control unit 210 may control the scan function input unit 240 so that signals related to various functions inputted through the scan function input unit 240 by the user are transmitted into the external device.

The scanning unit 220 emits light onto a predetermined region of the object to be scanned to detect light reflected by the object, thereby acquiring a scan image corresponding to the predetermined region of the object to be scanned (hereinafter, referred to as a scan target object).

The scan target object represents a target object that contains information to be inputted/stored in the input device 200 by the user. Generally, the scan target object represents documents on which characters or pictures are displayed. Also, the predetermined region of the scan target object represents a two-dimensional region having a predetermined area unlike an existing line scan region.

That is, the scanning part 220 may emit light onto the scan target object and simultaneously, emit light onto the two-dimensional region having the predetermined area. A portion of the emitted light is reflected from the scan target object and then is inputted into the scanning unit 220. Here, the scanning unit 220 detects the reflected light to generate scan information. For example, scan information digitalized as number 1 that represents a portion in which the reflected light is detected and number 0 that represents a portion in which the reflected light is not detected.

Since the scan information contains information with respect to the portion in which the light is emitted, i.e., the two-dimensional region having a predetermined area, a portion of the whole of the scan information may be imagified to acquire a scan image corresponding to a predetermined region of the scan target object.

In an embodiment, the scanning unit 220 may include a camera unit. The camera unit may be fixed to the inside of the input device 200 to maintain an optical distance from the scan target object, thereby an image frame that is a unit screen of the scan target object.

The position detection unit 230 detects X-Y axis position movement according to movement of the input device 200. Explaining the method of detecting the information with respect to the position movement and the position data in more detail, X-Y coordinates with respect to a specific point are obtained to store reference position data in the storage unit 260. Thereafter, if the input device 200 moves, X-Y coordinates with respect to a new point are obtained to compare the new position data to the reference position data stored in the storage unit 260. The above-described process may be repeatedly performed to detect the position movement of the input device 200.

The information with respect to the detected position movement of the input device 200 may match the scan image acquired through the above-described scanning unit 220 to transmit the matched information into the display device 100.

The scan function input unit 240 includes a scanner function select button, a wheel button, and left/right buttons around the wheel button.

When the user inputs the scanner function select button, the input device 200 generates a scan start request signal for entering into a scan mode and an edit request signal for converting the scan mode into an edit mode.

The wheel button and the left/right button generate a signal corresponding to a function allotted in each of the scan mode and the edit mode.

The communication interface 250 performs radio wire communication with an external device to transmit or receive various input signals and the image, audio, or data signals into or from the external device.

When the communication interface 150 communicates with the external device through a wire, the communication interface 150 may be constituted by a serial, PS/2, USB, etc. Also, the communication interface 150 wirelessly communicates with the external device, the communication interface 150 may be constituted by a radio frequency identification (FRID), an infrared data association (IrDA), an ultra wideband (UWB), a Zigbee, a digital living network alliance (DLNA), etc.

The storage unit 260 may store the scan image acquired from the scanning unit 220, the position data acquired from the position detection unit 230, and the information with respect to the position movement.

The storage unit 260 may include at least one type storage medium of a flash memory type storage medium, a hard disk type storage medium, a multimedia card micro type storage medium, a card type memory (for example, an SD or XD memory), a RAM, and a EEPROM.

Although not shown in FIG. 1, the input device 200 may further include a predetermined display unit (not shown). In this case, the display unit (not shown) may include PDP, LCD, OLED, flexible displays, 3D displays, and the like. Alternatively, the display unit (not shown) may include a touch screen so that the display unit (not shown) is used as an input device in addition to an output device.

Also, the display unit (not shown) may display the scan image acquired from the scanning unit 220.

FIG. 2 is plan and back views of an input device having a scan function according to an embodiment.

FIG. 2A is a plan view of a mouse that is an example of the input device 200. The mouse 200 includes the scan function input unit 240 receiving a plurality of functions on a front surface thereof. The scan function input unit 240 includes a scanner function select button 241, a wheel button 242, and left/right buttons 243 and 244 around the wheel button.

Referring to FIG. 2B, the mouse 200 includes an actual scan region 221 for acquiring a scan image from the scan target object on a back surface thereof. The scanning unit 220 emits light onto the scan target object through the actual scan region 221. A portion of the emitted light may be reflected from the scan target object so that the reflected light is incident into the scanning unit 220.

An input device and an image processing method thereof according to another embodiment will be described.

Figure 3:
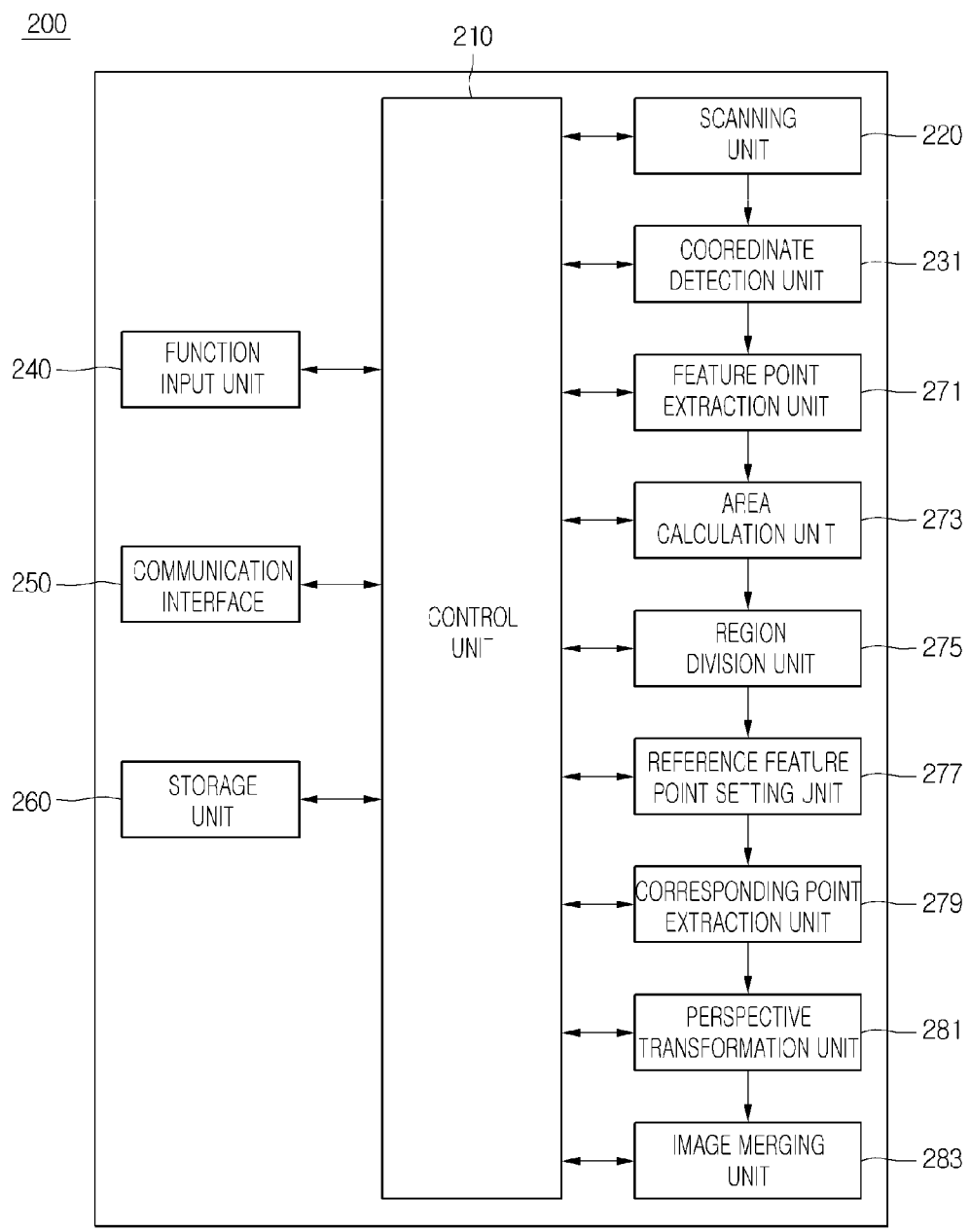
FIG. 3 is a block diagram of an input device according to another embodiment.

FIG. 3 is a block diagram of an input device according to another embodiment.

Referring to FIG. 3, an input device 200 according to another embodiment may include a function input unit 240, a communication interface 250, a storage unit 260, a scanning unit 220, a coordinate detection unit 231, a feature point extraction unit 271, an area calculation unit 273, a region division unit 275, a reference feature point setting unit 277, a corresponding point extraction unit 279, a perspective transformation unit 281, an image merging unit 283, and a control unit 210.

The function input unit 240, the communication interface 250, and the storage unit 260 of the above-described units are the same as those of FIG. 1, and thus their detailed descriptions will be omitted.

The scanning unit 220 may acquire an image frame that is a unit image of a scan target object. The scanning unit 220 may acquire the image frame through a scan region 221 of FIG. 2B.

The scanning unit 220 may acquire a first image frame of the scan target object and acquire a second image frame according to movement of the input device 200.

The coordinate detection unit 231 may detect coordinates of the image frame required by the scanning unit 220. Although a laser sensor may be used as the coordinate detection unit 231 in an embodiment, the present disclosure is not limited thereto. A process of detecting the coordinates of the image frame by using the coordinate detection unit 231 will be described later.

The feature point extraction unit 271 may extract a plurality of feature points with respect to an overlap region of the acquired first and second image frames. Detailed descriptions with respect thereto will be described later.

The area calculation unit 273 may calculate an area of the overlap region between the first image frame and the second image frame by using the coordinates of the acquired first and second image frames. Detailed descriptions with respect thereto will be described later.

The region division unit 275 may divide the overlap region into a plurality of sub overlap regions by using the calculated area of the overlap region between the first image frame and the second image frame. Here, each of the sub overlap regions may be divided into a first unit region and a second unit region. Detailed descriptions with respect thereto will be described later.

The reference feature point setting unit 277 may set one of a plurality of feature points disposed within the divided first unit region as a first reference feature point.

The reference feature point setting unit 277 may set one of a plurality of feature points disposed within the divided second unit region as a second reference feature point. Detailed descriptions with respect thereto will be described later.

The corresponding point extraction unit 279 may extract a plurality of corresponding points of the first and second image frames by using the second reference feature point set in the overlap region. Detailed descriptions with respect thereto will be described later.

The perspective transformation unit 281 may perspectively transform the first and second image frames on the basis of the extracted corresponding points.

The image merging unit 283 may merge the first and second image frames that are prospectively transformed to output a completed image.

The control unit 210 may control an overall operation of the input device 200.

Particularly, the control unit 210 may confirm whether other feature points except for the first reference feature point exist within the first unit region through the set first reference feature point. If other feature points except for the first reference feature point exist within the first unit region, other feature points except for the first reference feature point may be removed.

Also, the control unit 210 may confirm whether other feature points except for the second reference feature point exist within the second unit region through the set second reference feature point. If other feature points except for the second reference feature point exist within the second unit region, it is confirmed whether the number of second reference feature point is less than five with respect to each of the sub overlap regions.

If the number of second reference feature point is greater than five with respect to each of the sub overlap region, the control unit 210 may remove the remaining first reference feature points except for the second reference feature points within the second unit region.

If the number of second reference feature point is less than five with respect to each of the sub overlap region, the control unit 210 may not remove the remaining first reference feature points except for the second reference feature points within the second unit region.

Figure 4:
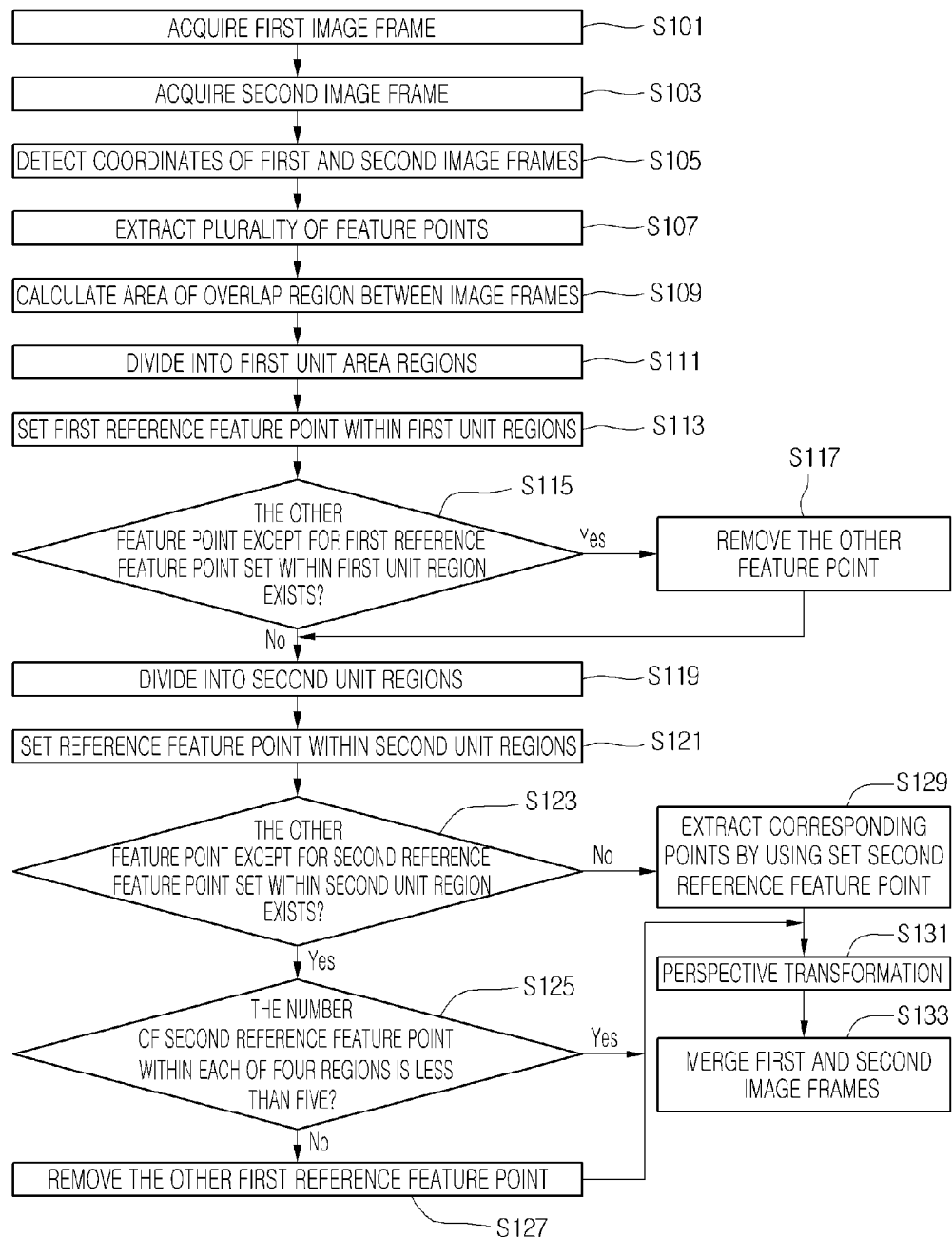
FIG. 4 is a flowchart for explaining an image process method of an input device according to an embodiment.

FIG. 4 is a flowchart for explaining an image process method of an input device according to an embodiment.

First, a scanning unit 220 of an input unit 220 acquires a first image frame of a scan target object (S101). The scanning unit 220 may emit light onto a predetermined region of the object to be scanned to detect light reflected by the object, thereby acquiring an image frame corresponding to the predetermined region of the scan target object.

The scan target object represents a target object that contains information to be inputted/stored in the input device 200 by the user. Generally, the scan target object represents documents on which characters or pictures are displayed. Also, the predetermined region of the scan target object represents a two-dimensional region having a predetermined area unlike an existing line scan region. In an embodiment, the two-dimensional region may represent a rectangular region.

The scanning unit 220 of the input unit 200 acquires a second image frame of the scan target object according to movement of the input device 200 (S103).

A coordinate detection unit 231 of the input device 200 detects coordinates of the acquired first and second image frames (S105). In an embodiment, the coordinate detection unit 231 may detect coordinates with respect to an intersection point between a division line by which the acquired image frame is divided into four regions and a boundary line of the image frame and edge coordinates of the image frame. This will be described in detail with reference to FIG. 5.

Figure 5:
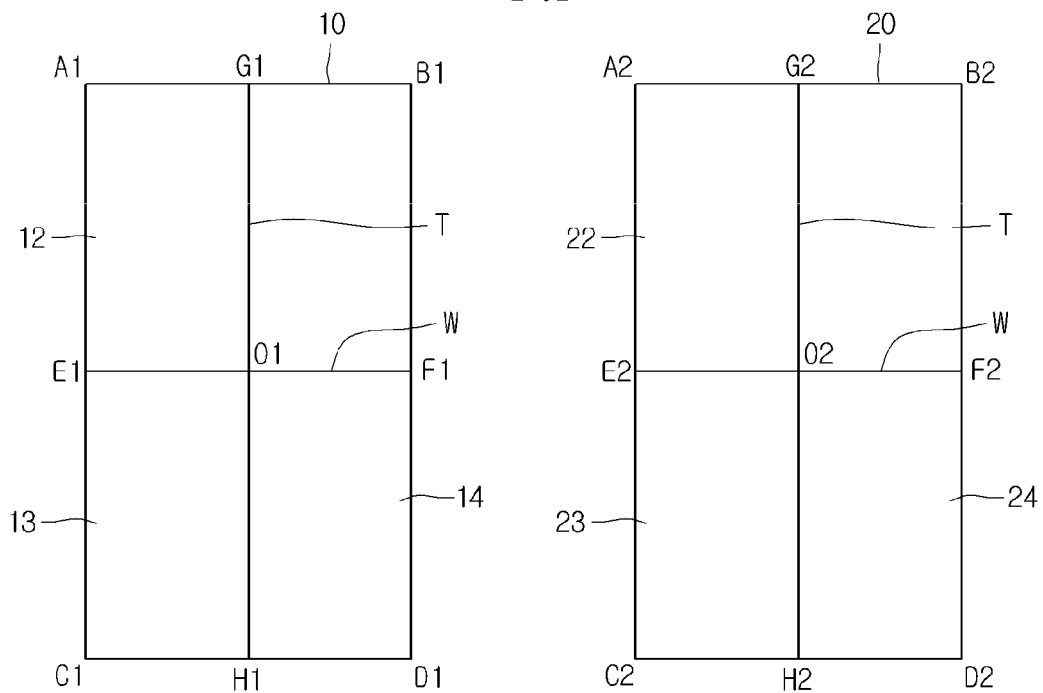
FIG. 5 is a view for explaining a process of detecting coordinates of an image frame by using the input device according to an embodiment.

FIG. 5 is a view for explaining a process of detecting coordinates of the image frame by using the input device according to an embodiment.

FIG. 5 illustrates a first image frame 10 acquired through the scanning unit 220 of the input device 200. The acquired first image frame 10 may have a rectangular shape. That is, when a scan region scanned through the input device 200 has a rectangular shape, the first image frame 10 may also have the rectangular shape as shown in FIG. 5.

The first image frame 10 may be divided into four uniform regions by an X-axis division line W and a y-axis division line T. That is, the first image frame 10 may be divided into a first quadrant region 11, a second quadrant region 12, a third quadrant region 13, and a fourth quadrant region 14 by the X-axis division line W and the y-axis division line T.

The coordinate detection unit 231 of the input device 200 may detect edge coordinates A1, B1, C1, and D1 of the first image frame 10, coordinates E1 and F1 with respect to an intersection point between the x-axis division line W and a boundary line of the first image frame 10, and coordinates G1 and H1 with respect to an intersection point between the y-axis division line T and a boundary line of the second image frame 10.

In an embodiment, a laser sensor may be used as the coordinate detection unit 231. The laser sensor may emit a laser into a predetermined region of a scan target object, and then detect edge coordinates A1, B1, C1, and D1 of the first image frame 10, coordinates E1 and F1 with respect to an intersection point between the x-axis division line W and a boundary line of the first image frame 10, and coordinates G1 and H1 with respect to an intersection point between the y-axis division line T and a boundary line of the second image frame 10 by using the reflected laser.

In an embodiment, the coordinate detection unit 231 may detect only a center coordinate O1 of the acquired first image frame 10. Since the image frame acquired through the scanning unit 220 has the same size, if only the center coordinate O1 of the image frame is detected, the coordinates A1 to H1 may be detected according to relative positions with respect to the center coordinate O1.

The coordinate detection unit 231 may also detect coordinates of the second image frame through the above-described process.

FIG. 4 will be described again.

The feature point extraction unit 271 of the input device 200 may extract a plurality of feature points within an overlap region of the first and second image frames (S107). Here, the feature points (corner points) may represent boundary points along which the scan target object moves within the overlap region and two or two or more variation intersection points. The plurality of feature points may be important reference points when the overlap region of the image frames is merged.

Figure 6:
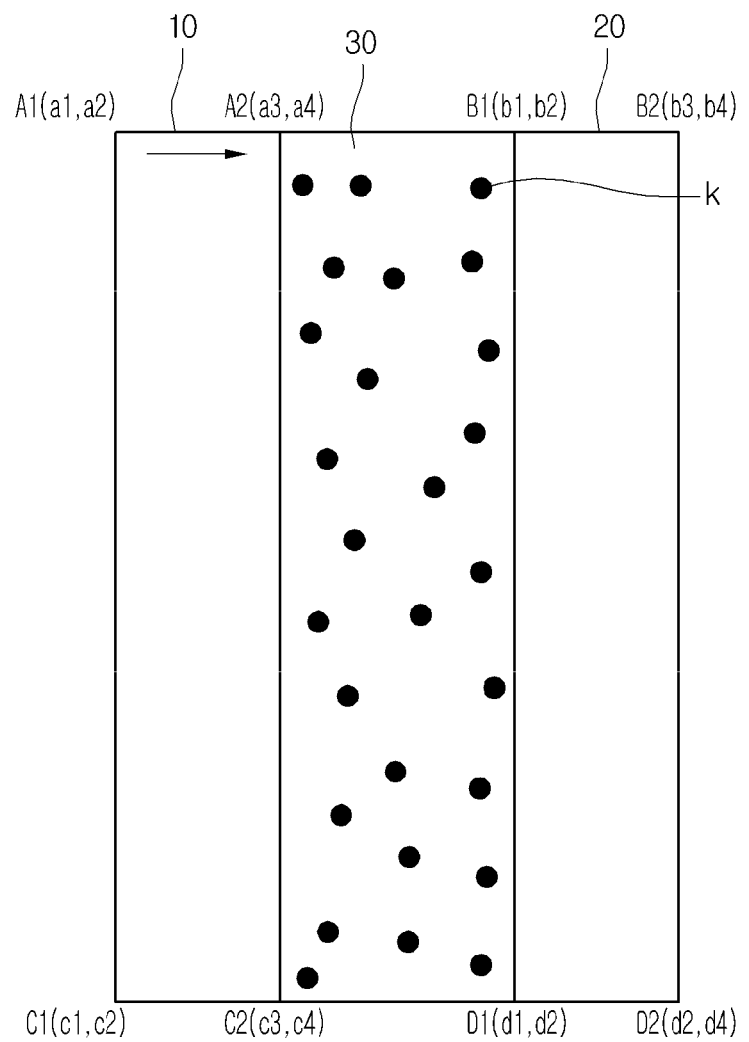
FIG. 6 is a view illustrating a process of extracting a plurality of feature points according to an embodiment.

FIG. 6 is a view illustrating a process of extracting a plurality of feature points according to an embodiment.

Referring to FIG. 6, a plurality of feature points k are extracted within an overlap region 30 of a first image frame 10 and a second image frame 20. The number of extracted feature points k may vary according to a shape of an image of a scan target object within the overlap region 30.

Although the plurality of feature points k are extracted by using an image mosaic algorithm in an embodiment, the present disclosure is not limited thereto. For example, the plurality of feature points may be extracted by using various methods.

FIG. 4 will be described again.

The area calculation unit 273 of the input device 200 calculates an area of the overlap region between the first image frame and the second image frame by using the coordinates of the acquired first and second image frames (S109). The area calculation unit 273 of the input device 200 may calculate an area of the overlap region by using the edge coordinates of the detected first image frame and the edge coordinates of the second image frame. Hereinafter, this will be described with reference to FIG. 7.

Figure 7:
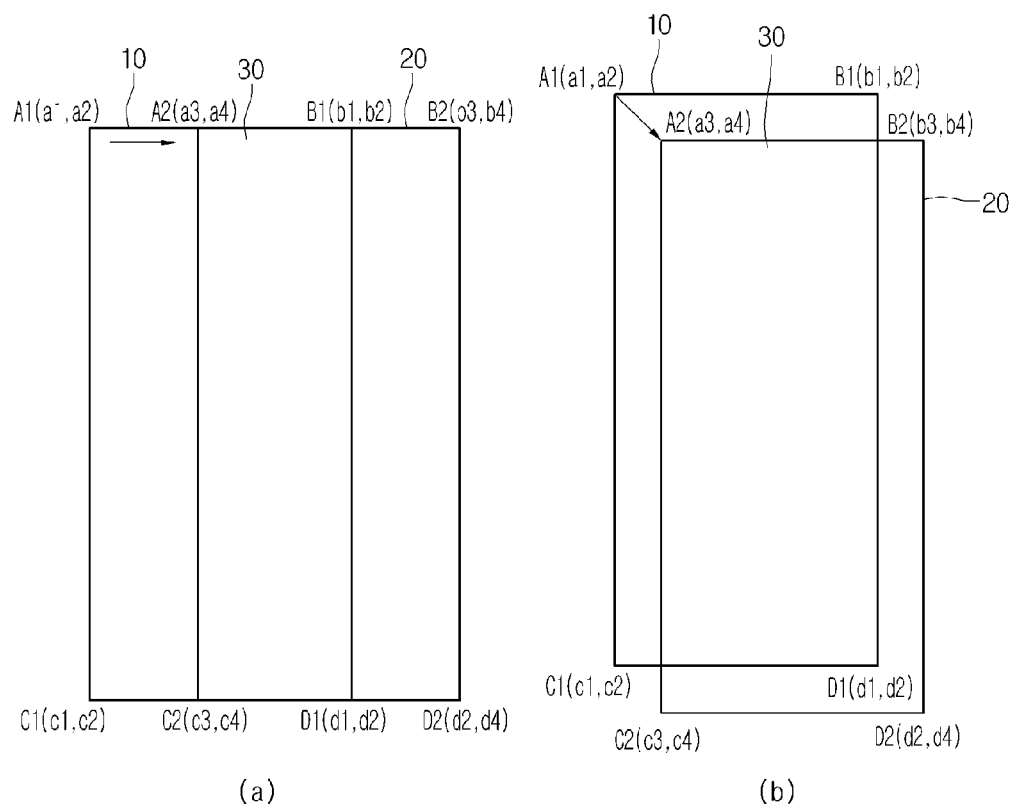
FIG. 7 is a view illustrating a process of calculating an area of an overlap region of the image frame according to an embodiment.

FIG. 7 is a view illustrating a process of calculating an area of the overlap area of the image frame according to an embodiment.

FIG. 7A illustrates a process of calculating an area of the overlap region 30 between the first image frame 10 and the second image frame 20 when the input device 200 moves in a horizontal direction, and FIG. 7B illustrates a process of calculating an area of the overlap region 30 between the first image frame 10 and the second image frame 20 when the input device 200 moves in a diagonal direction.

First, referring to FIG. 7A, if it is assumed that a reference point of the first image frame 10 is C1, an area S1 of the overlap region 30 between the first image frame 10 and the second image frame 20 may be calculated as follow: $((d_1-c_1)-(c_3-c_1)) \times (a_2-c_2)$.

Referring to FIG. 7B, if it is assumed that a reference point of the first image frame 10 is C1, an area S1 of the overlap region 30 between the first image frame 10 and the second image frame 20 may be calculated as follow: $((d1-c1)-(c3-c1))\times(a4-c2)$.

FIG. 4 will be described again.

The region division unit 275 of the input device 200 divides the overlap region into first unit regions by using an area of the overlap region of the first and second image frames (S111). That is, the region division unit 275 may divide the overlap region into first unit regions each having a first unit area.

In an embodiment, the region division unit 275 may divide the overlap region into 3×3 unit regions. Here, the 3×3 unit regions may represent regions in which nine squares having the same area are disposed in a matrix form. Here, the 3×3 unit regions may be merely an example. Also, one side of each of the squares may have a length of about 1 mm. However, the length of about 1 mm may be merely an example.

The reference feature point setting unit 277 may set one of a plurality of feature points disposed within the divided first unit region as a first reference feature point (S113). In an embodiment, the reference feature point setting unit 277 may set a feature point disposed at a center coordinate of the first unit region of the feature points disposed within the first unit region as a first reference feature point. In an embodiment, the reference feature point setting unit 277 may set a feature point closest to the center coordinate of the first unit region as a first reference feature point if a feature point does not exist at the center coordinate of the first unit region.

The operations S111 and S113 will be described with reference to FIG. 8.

FIG. 8 is a view illustrating a process of setting the first feature point within an overlap region between the first image frame and the second image frame according to an embodiment.

Referring to FIG. 8, the region division unit 275 may divide an overlap region 30 into a plurality of unit regions 31 in operation S111.

The setting of the reference feature point in the operation S113 may be performed in a state where the overlap region 30 of the first image frame 10 and the second image frame is divided into a plurality of sub overlap regions. The plurality of sub overlap regions may be an overlap region between a second quadrant region 12 of the first image frame and a second quadrant region 22 of the second image frame 20, an overlap region between a first quadrant region 11 of the first image frame 10 and first and second quadrant regions 21 and 22 of the second image frame 20, an overlap region between a third quadrant region 13 of the first image frame 10 and a third quadrant region 23 of the second image frame 20, and an overlap region between a fourth quadrant region 14 of the first image frame 10 and third and fourth quadrant regions 23 and 24 of the second image frame 20.

The region division unit 275 may divide the overlap region 30 into a plurality of sub overlap regions by using the coordinates of the first image frame 10 and the coordinates of the second image frame 20 which are detected by the coordinate detection unit 231.

The reference feature point setting unit 277 may set a first reference feature point with respect to each of the plurality of sub overlap regions. Particularly, the sub overlap region between the second quadrant region 12 of the first image frame 10 and the second quadrant region 22 of the second image frame 20 may be divided into a plurality of first unit regions 31. Also, the reference feature point setting unit 277 may set a first reference feature point of the plurality of feature points existing within the first unit regions 31.

Referring to a first unit region 31 of FIG. 8, a plurality of feature points k exist in the first unit region 31. The reference feature point setting unit 277 may set a feature point k2 closest to a center coordinate O31 of the first unit region 31 of the plurality of feature points k within the first unit region 31 as a first reference feature point of the first unit region 31. Of cause, when the feature point k is disposed at the center coordinate O31 of the first unit region 31, the feature point k may be defined as the first reference feature point of the first unit region 31.

Through the above-described method, the reference feature point setting unit 277 may set a reference feature point with respect to a plurality of first unit regions 31 of the sub overlap region between the second quadrant region 12 of the first image frame 10 and the second quadrant region 22 of the second image frame 20 and also set a reference feature point with respect to other sub overlap regions of the overlap region 30 through the above-described process.

FIG. 4 will be described again.

The control unit 210 of the input device 200 may confirm whether other feature points except for the first reference feature point exist within the first unit region through the set first reference feature point (S115). If other feature points except for the first reference feature point exist within the first unit region, other feature points except for the first reference feature point may be removed (S117). Hereinafter, this will be described again with reference to FIG. 8.

Referring to the first unit region 31 of FIG. 8, a feature point k2 is set as a first reference feature point. Since other feature points k1 and k3 except for the first reference feature point k2 exist within the first unit region 31, the control unit 210 removes other feature points k1 and k3, and thus, only the first reference feature point k2 remains.

As described above, the control unit 210 removes other feature points so that only the first reference feature point remains in the first unit region 31 of the overlap region 30 divided into the plurality of sub overlap regions. Then, this process is repeatedly performed.

FIG. 4 will be described again.

The region division unit 275 of the input device 200 divides the overlap region between the first image frame and the second image frame into second unit regions (S119). That is, the region division unit 275 may divide the overlap region into second unit regions each having a second unit area. Here, the second unit area is greater than the first unit area.

In an embodiment, the region division unit 275 may divide the overlap region into 20×20 unit regions. Here, the 20×20 unit regions may represent regions in which 400 squares having the same area are disposed in a matrix form. Here, the 20×20 unit regions may be merely an example. Also, one side of each of the squares may have a length of about 1 mm. However, the length of about 1 mm may be merely an example.

The reference feature point setting unit 277 of the input device 200 may set one of a plurality of reference feature points disposed within the divided second unit region as a second reference feature point (S121). In an embodiment, the reference feature point setting unit 277 may set a first reference feature point disposed at a center coordinate of the second unit region of the first reference feature points disposed within the second unit region as a second reference feature point. In an embodiment, the reference feature point setting unit 277 may set a first reference feature point closest to the center coordinate of the second unit region as a second reference feature point if a first reference feature point does not exist at the center coordinate of the second unit region.

The operations S119 and S121 will be described with reference to FIG. 9.

FIG. 9 is a view illustrating a process of setting a second feature point within the overlap region between the first image frame and the second image frame according to an embodiment.

Referring to FIG. 9, the region division unit 275 may divide an overlap region 30 into a plurality of second unit regions 31 in operation S119.

The setting of the reference feature point in the operation S119 may be performed in a state where the overlap region 30 of the first image frame 10 and the second image frame 20 is divided into a plurality of sub overlap regions. The four sub overlap regions may be an overlap region between a second quadrant region 12 of the first image frame and a second quadrant region 22 of the second image frame 20, an overlap region between a first quadrant region 11 of the first image frame 10 and first and second quadrant regions 21 and 22 of the second image frame 20, an overlap region between a third quadrant region 13 of the first image frame 10 and a third quadrant region 23 of the second image frame 20, and an overlap region between a fourth quadrant region 14 of the first image frame 10 and third and fourth quadrant regions 23 and 24 of the second image frame 20.

The reference feature point setting unit 277 may set a second reference feature point with respect to each of the plurality of sub overlap regions. Particularly, the overlap region between the second quadrant region 12 of the first image frame 10 and the second quadrant region 22 of the second image frame 20 may be divided into a plurality of first unit regions 32. Also, the reference feature point setting unit 277 may set a second reference feature point of the plurality of feature points existing within the second unit regions 32.

Referring to a second unit region 32 of FIG. 9, a plurality of first feature points k2 exist in the second unit region 32. The reference feature point setting unit 277 may set a first feature point k2_1 closet to a center coordinate O32 of the second unit region 32 of the plurality of first reference feature points k2 within the second unit region 32 as a second reference feature point of the second unit region 31. Of cause, when the first reference feature point k2 is disposed at the center coordinate O32 of the second unit region 32, the first reference feature point k2 may be defined as the second reference feature point of the second unit region 32.

Through the above-described method, the reference feature point setting unit 277 may set a reference feature point with respect to the plurality of second unit regions 32 of the sub overlap region between the second quadrant region 12 of the first image frame 10 and the second quadrant region 22 of the second image frame 20 and also set a second reference feature point with respect to other sub overlap regions of the overlap region 30 through the above-described process.

FIG. 4 will be described again.

The control unit 210 of the input device 200 confirms whether the other first reference feature point exists within the second unit region through the set second reference feature point (S123).

If the other second reference feature point except for the second reference feature point exists within the second unit region, the control unit 210 of the input device 200 confirms whether the number of second reference feature point is less than five with respect to the plurality of sub overlap regions (S125).

If the number of second reference feature point is greater than five with respect to the sub overlap region, the control unit 210 may remove the remaining first reference feature points except for the second reference feature points within the second unit region. Hereinafter, this will be described again with reference to FIG. 9.

Referring to the second unit region 32 of FIG. 9, a feature point k2_2 is set as a second reference feature point. Since other feature points k2_1 and k2_3 except for the second reference feature point k2_2 exist within the second unit region 32, the control unit 210 removes other first reference feature points k2_1 and k2_3, and thus, only the second reference feature point k2_2 remains.

The control unit 210 removes other first reference feature points so that only the second reference feature point remains in the second unit region 32 of the sub overlap region. Then, this process is repeatedly performed. FIG. 4 will be described again.

If the other second reference feature point except for the second reference feature point exists within the second unit region, and the number of second reference feature points is less than five with respect to each of the sub overlap regions, the corresponding point extraction unit 279 extracts a plurality of corresponding points of the first and second frames by using the second reference feature points set in the overlap region (s129). If the number of second reference feature point is less than five within each of the sub overlap regions, a reason in which the process of removing the first reference feature point in the operation S127 is not performed is for preventing limitations from occurring when the image frames are merged.

The corresponding point extraction unit 279 may extract corresponding points by selecting portions of the plurality of second reference feature points set in each of the sub overlap regions of the first and second image frames. Although the number of second reference feature points selected from the plurality of second reference feature points set in each of the regions may be four, this may be merely an example. Hereinafter, this will be described with reference to FIG. 10.

Figure 10:
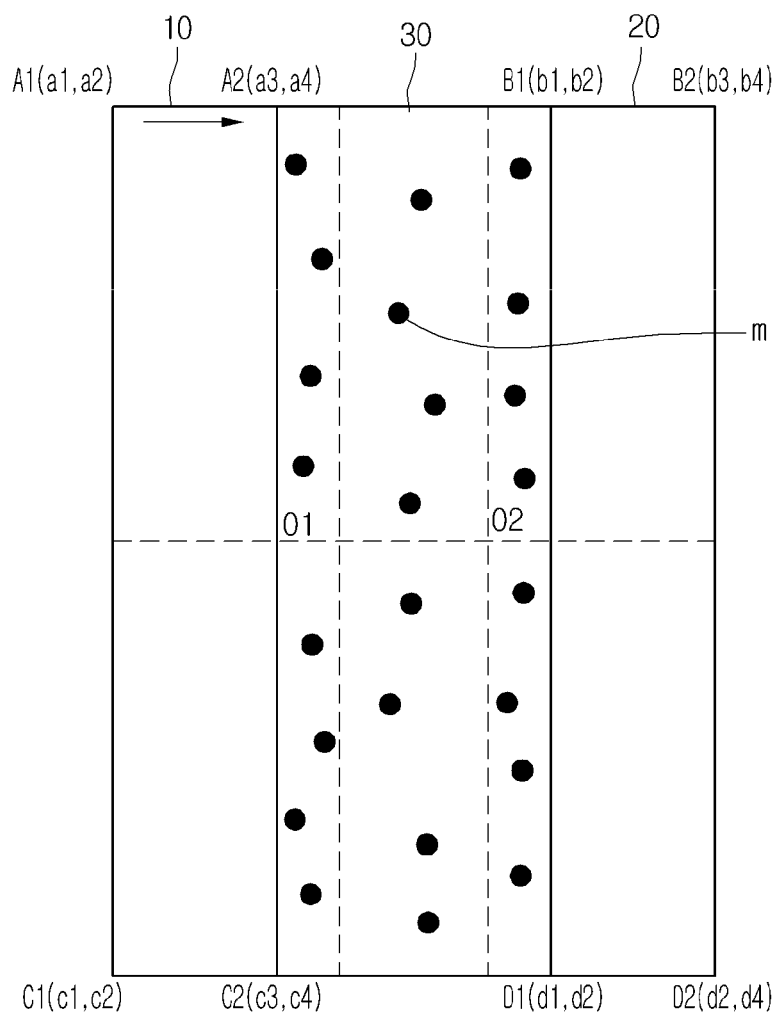
FIG. 10 is a view of a state in which a corresponding point is extracted to merge the image frames with each other according to an embodiment.

FIG. 10 is a view of a state in which a corresponding point is extracted to merge the image frames with each other according to an embodiment.

FIG. 10 illustrates a plurality of corresponding points m extracted within the overlap region 30 of the first and second image frames 10 and 20. As shown in FIG. 10, although four corresponding points m are extracted within each of the sub overlap regions constituting the overlap regions 30, this may be merely an example.

FIG. 4 will be described again.

The perspective transformation unit 281 may perspectively transform the first and second image frames on the basis of the extracted corresponding points (S131). The perspective transformation may be transformation defining a relationship between two images that are obtained by projecting one two-dimensional object onto two planes different from each other. Since the perspective transformation is the well-known technology, its detailed description will be omitted.

The image merging unit 283 may merge the first and second image frames that are perspectively transformed (S133). Since the perspectively transformed first and second image frames are geometrically deformed, the image merging unit 283 may complement the unnatural first and second image frames through a color blending method to merge as one completed image. Since the color blending method is the well-known technology, its detailed description will be omitted.

The image process method of the input device according to the above-described embodiments can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage, and even carrier wave (for example, transmission over the Internet).

The computer readable record medium may be distributed to computer systems over a network, in which computer readable codes may be stored and executed in a distributed manner. A function program, codes and code segments for implementing the present invention can be easily inferred by programmers of a technical field pertaining to the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing method of an input device having a scan function, the image processing method comprising:
    acquiring a first image frame and a second image frame to detect coordinates of the acquired first image frame and coordinates of the acquired second image frame;
    dividing an overlap region between the first image frame and the second image frame into a plurality of sub overlap regions by using the detected coordinates of the first and second image frames;
    dividing each of the sub overlap regions into unit regions;
    setting a reference feature point of a plurality of feature points within the divided unit regions;
    extracting corresponding points by using the set reference feature point;
    performing perspective transformation of the first and second image frames by using the extracted corresponding points; and
    merging the perspectively transformed first and second image frames,
    wherein the dividing of each of the sub overlap regions into the unit regions comprises:
    dividing each of the sub overlap regions into a plurality of first unit regions; and setting a first reference feature point of the plurality of feature points within each of the first unit regions and the method further comprising:
    confirming whether the other feature point except for the first reference feature point exists within each of the first unit regions; and
    when the other feature point except for the first reference feature point exists within each of the first unit regions, removing the other feature point.

2. The image processing method according to claim 1, wherein the dividing of each of the sub overlap regions comprises:
    dividing each of the sub overlap regions into a plurality of second unit regions; and
    setting a second reference feature point of the plurality of first reference feature points within each of the second unit regions,
    wherein each of the second unit regions has an area greater than that of each of the first unit regions.

3. The image processing method according to claim 2, further comprising:
    confirming whether the other first reference feature point except for the second reference feature point exists within each of the second unit regions; and
    when the other first reference feature point except for the second reference feature point exists within each of the second unit regions, removing the other first reference feature point.

4. The image processing method according to claim 3, when the number of second reference feature point within each of the sub overlap regions is less than a preset number, further comprising unremoving the other first reference feature point.

5. The image processing method according to claim 4, further comprising extracting corresponding points with respect to the overlap region between the first image frame and the second image frame by using the set second reference feature point.

6. The image processing method according to claim 1, wherein the detecting of the coordinates of the first and second image frames further comprises:
    dividing each of the first and second image frames into four regions through two division lines; and
    detecting coordinate of an intersection point between the two division lines and a boundary line of the first and second image frames and edge coordinates of the first and second image frames.

7. The image processing method according to claim 1, further comprising calculating an area of the overlap region by using the detected coordinates of the first and second image frames.

8. A non-transitory computer readable record medium in which a program for executing the image processing method of the input device disclosed in claim 1 is recorded.

9. An input device having a scan function, the input device comprising:
    a scanner acquiring a first image frame and a second image frame;
    a coordinate detector detecting coordinates of the acquired first image frame and coordinates of the acquired second image frame;
    a region divider dividing an overlap region between the first image frame and the second image frame into a plurality of sub overlap regions by using the detected coordinates of the first and second image frames, the region division unit dividing each of the sub overlap regions into unit regions;
    a reference feature point setter setting a reference feature point of a plurality of feature points within the divided unit regions;
    a corresponding point extractor extracting corresponding points by using the set reference feature point;
    a perspective transformer perspectively transforming the first and second image frames by using the extracted corresponding points; and
    an image merger merging the perspectively transformed first and second image frames,
    wherein the region divider divides each of the sub overlap regions into a plurality of first unit regions,
    wherein the reference feature point setter sets a first reference feature point of the plurality of feature points within each of the first unit regions, and
    wherein the input device further comprises:
    a controller removing the other feature point when the other feature point except for the first reference feature point exists within each of the first unit regions after the other feature point except for the first reference feature point exists within each of the first unit regions.

10. The input device according to claim 9, wherein the region divider divides each of the sub overlap regions into a plurality of second unit regions, wherein the reference feature point setter sets a second reference feature point of the plurality of first feature points within each of the second unit regions, and wherein each of the second unit regions has an area greater than that of each of the first unit regions.

11. The input device according to claim 10, wherein the controller removes the other first reference feature point when the other first reference feature point except for the second reference feature point exists within each of the first unit regions after the other first reference feature point except for the second reference feature point exists within each of the second unit regions.

12. The input device according to claim 11, wherein, when the number of second reference feature point within each of the sub overlap regions is less than a preset number, the other first reference feature point is not removed.

13. The input device according to claim 12, wherein the corresponding point extractor extracts corresponding points with respect to the overlap region between the first image frame and the second image frame by using the set second reference feature point.

* * * * *